United States Patent [19]

Hanulik

[11] Patent Number: 4,858,833

[45] Date of Patent: Aug. 22, 1989

[54] PROCESS FOR RECYCLING FLUORESCENT AND TELEVISION TUBES

[75] Inventor: Jozef Hanulik, Zurich, Switzerland

[73] Assignee: Recytec S.A., Switzerland

[21] Appl. No.: 211,982

[22] Filed: Jun. 27, 1988

[30] Foreign Application Priority Data

Jun. 29, 1987 [CH] Switzerland .......................... 2437/87

[51] Int. Cl.$^4$ ............................................. B02C 19/14
[52] U.S. Cl. ...................................... 241/24; 210/705;
210/712; 241/25; 241/99
[58] Field of Search ............... 210/704, 705, 711, 712,
210/773, 805; 241/21, 30, 25, 20, 99, DIG. 38, 24

[56] References Cited

U.S. PATENT DOCUMENTS 4,607,798  8/1986  Odlin ...................................... 241/99

FOREIGN PATENT DOCUMENTS 248198  12/1987  European Pat. Off. .............. 241/99
96630  6/1984  Japan ...................................... 241/99
1299544  3/1987  U.S.S.R. ............................... 241/99

*Primary Examiner*—Mark Rosenbaum
*Attorney, Agent, or Firm*—Kane, Dalsimer, Sullivan, Kurucz, Levy, Eisele and Richard

[57] ABSTRACT

To recycle fluorescent and television tubes, the latter are introduced into a container which can be sealed in a gas-tight manner and crushed under water. In this process, the ascending gases released are drawn off under suction and fed in a compressed state to the reuse process, acid which dissolves or strips off the pollutants being added to the broken glass, which is coated with pollutants, the dissolved and stripped-off pollutants are flushed out of the broken glass, the metallic constituents are removed therefrom and then the broken glass is passed to the further utilization process. A precipitating agent is added to the liquid phase and the liquid phase is then filtered, the yttrium-containing filter cake being delivered to lanthanide manufacturers for further processing. The filtrate is fed back to the container in which the tubes are crushed.

5 Claims, 1 Drawing Sheet

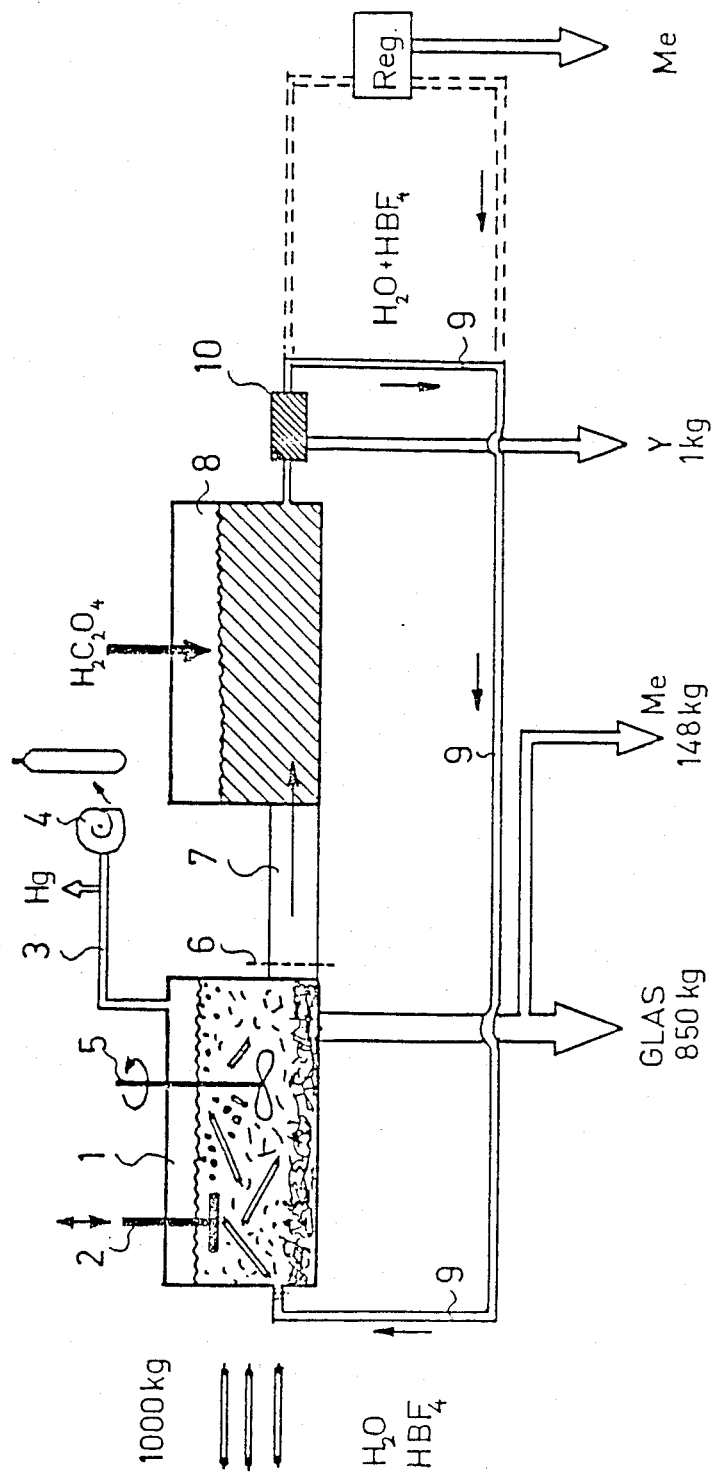

PROCESS FOR RECYCLING FLUORESCENT AND TELEVISION TUBES

FIELD OF THE INVENTION

The present invention relates to a process for recycling fluorescent and television tubes, which are first crushed, after which the metallic constituents are separated off, and the broken glass produced is washed and fed to the glass recycling process.

PRIOR ART

Such a process is being carried out by the Fairtec AG Company in CH-5300 Turgi using a pilot plant and was published in a company brochure dated Mar. 1987, but the process was described, however, solely for fluorescent tubes.

According to the data of the Swiss Illumination Engineering Society, the consumption of fluorescent tubes in Switzerland is at present estimated at approximately 9,000,000 pieces/year. In terms of weight, this is around 2,250 tonnes or in terms of volume approximately 15,000 m of fluorescent tubes which have to be disposed of in special waste disposal sites. In the first phase carried out hitherto, the abovementioned-process is only designed to crush the tubes and thereby reduce the quantity in terms of volume for the special waste disposal site. It is only according to the complete published process that the broken glass in intended to be washed, the metal parts then removed and Hg, Cd and also the glass to be recycled.

Often, however, recycling processes fail due to inadequate profitability and the expense of working safety due to the Hg vapors produced.

SUMMARY OF THE INVENTION

The object of the present invention is to improve a process of the type mentioned in the introduction in a manner such that, on the one hand, it becomes more economic as a result of higher returns through recycling further substances and, on the other hand, it can be carried out more inexpensively.

This is achieved in that the process mentioned in the introduction comprises the following additional steps wherein the tubes are introduced into a container which can be sealed in a gas-tight manner and are crushed under water, the ascending gases released being drawn off by suction and fed in a compressed state to the reuse process and an acid which dissolves or strips all the pollutants being added to the broken glass, which is coated with pollutants, the dissolved and stripped-off pollutants are flushed out of the broken glass and the metallic constituents are removed therefrom and then the broken glass is passed to the further utilization process, a precipitating agent is added to the liguid phase and the latter is then filtered, the filter cake being supplied to lanthanide manufacturers for further processing, after which the filtrate is fed back to the container in which the tubes are crushed.

In the known process, no significance is attributed to the noble gas or noble gas mixture during the crushing, although it is produced in relatively concentrated form. Although another fluorescent tube disposal process is known in which the ends are cut off and the tubes are blown out, the noble gases are lost during blowing out and the pollutants are only inadequately removed. The effect of the process according to the invention is already extremely positive in this connection in the first step. As a result of crushing under water, both tubes at positive pressure, such as fluorescent tubes, and also tubes at reduced pressure, such as television tubes, can safely be crushed. The ascending gases can be collected without coming into contact with the ambient atmosphere. Any escape of the mercury vapor present in the gases is equally impossible. The noble gas mixture can simply be compressed and fed to the reutilization process. The mercury occurring therein distills during the compression and can be separated simply. In the known process, the broken glass is washed primarily for the purpose of reutilization, as a result of which the residual quantity which has to be disposed of is reduced. Since, however, the used glass price for lamp glass is not significant, this step was hitherto unprofitable. In addition, the purity of such glass was hitherto insufficient in some cases for reutilization. On the other hand, the hitherto usual cleaning removed from this glass heavy metals therein, such as Hg and Cd, so that it could be deposited at normal domestic waste disposal sites, as a result of which the final depositing was made cheaper.

The proposed cleaning by adding an acid which dissolves the pollutants improves the cleaning substantially and therefore provides a kind of glass which can be more readily utilized. A completely decisive factor, however, is the addition of a precipitating agent which enables the precipitable constituents to be removed, for example by sedimentation or filtration, after which the yttrium compounds present as a result of this precipitation can be removed. As is known, yttrium is present in every fluorescent tube in a quantity of at least 100 mg. The extremely expensive yttrium can consequently be recovered in high concentration and reutilized. This gives the process a substantial economic impetus. In Switzerland alone approx. 1% of the world production of yttrium could be recovered by this manner. Yttrium is one of the rare elements (lanthanides) which will substantially gain in importance in the future as a result of use in so-called superconductors. It is therefore to be expected that the value of the yttrium will increase severalfold.

Laboratory experiments have shown that $HBF_4$ acid is particularly suitable for washing the broken glass and for dissolving or stripping off the pollutants. Virtually all the noble and base metals can be dissolved in this acid. Yttrium dissolves therein predominantly as $Y^{3+}$, only a very small proportion being precipitated in the form of $YF_3$. It is important, however, that the concentration of the fluoroboric acid is kept as low as possible, advantageously below 0.5%. In this way, the aluminum constituents in the tube fittings are not converted into $AL(BF_4)_3$. Otherwise the production of $AL(BF_4)_3$ would place a heavy burden on the acid economy of the process. Advantageously, the precipitation is also by means of oxalic acid ($H_2C_2O_4$) so that the insoluble $Y(C_2O_4)_3 \cdot 9H_2O$ (yttrium oxalate) is formed.

BRIEF DESCRIPTION OF THE DRAWINGS

The process sequence is shown diagrammatically in the attached drawing and is explained on the basis of the description below.

DESCRIPTION OF THE PREFERRED EMBODIMENT

At present the disposal costs for fluorescent and T.V. tubes amount to SFr. 1,000.00 to 1,200.00/tonne. A batch of such tubes is introduced into a gas tight container 1. This contains a mixture of water and fluoboric acid ($HBF_4$). A crusher 2 destroys the tubes, the noble gas mixture released in the process ascending and being drawn off by suction via the exhaust pipe 3 and compressed by means of the compressor 4. Although this noble gas mixture is very pure due to the exclusion of air, it cannot be used directly for reutilization in fluorescent tubes because the composition of the gases in the tubes varies depending on the desired color of the light. The gas mixture can, however, be filled into bottles in the compressed state, after which the appropriate separation of the gases is possible using standard processes. Because the admixture of air was avoided, the concentration is so high that the mixture also acquires a relatively high price. It is also advantageous that the Hg vapor present condenses during compression and can be separated off in a leak-proof manner.

Crushing the tubes under water is also a particularly safe method, so that the protection of the workers does not require any large investments. It is particularly inexpensive if the container is a bath which is covered with a foil, the latter being manipulated like a gasometer container. Thus, the tubes to be crushed can first be introduced from above, the foil fitted so as to rest directly on the liquid and the crushing then begun. The foil is then automatically lifted by the gas collecting above the liquid against the atmospheric pressure.

The washing operation of the broken glass is promoted by a stirrer 5. As a result, a portion of the pollutants adhering to the broken glass is stripped off and the rest dissolved. Then the aqueous phase consisting of $H_2O$ and $HBF_4$ is pumped via a filter 6 with a mesh size of approximately 0.5 mm through a transfer pipe into a second tank 8. The proportion of entrained fine glass splinters is not significant and does not encumber the subsequent chemical process steps.

The broken glass with a metallic component remaining behind in the container 1 can be removed from the container and the metal component separated off. In this way, a batch of approx. 1,000 kg of fluorescent tubes yields about 850 kg of glass and 148 kg of metallic and organic waste. Both the glass and also the metallic waste can be fed to the reutilization process.

The second container 8 now contains a turbid liquid which is composed of $H_2O$, $HBF_4$ and also the pollutants, essentially lanthanides and superfine glass splinters. Oxalic acid ($H_2C_2O_4$) is now added to this filtrate as precipitating agent. After a certain reaction time, the corresponding lanthanide oxalates, which are produced as an insoluble precipitate, are formed.

After completion of the reaction, the second container 8 is pumped dry via the return line 9 in which a filter 10 is provided. The filtrate is fed back via the return pipe 9 to the first container 1. The filter cake deposited in the filter 10 having a proportion by weight of approximately 2 kg contains approximately 1 kg of yttrium which can be sold to the lanthanide manufacturers for reprocessing. A relatively pure mixture of $H_2O$ and $HBF_4$ containing some metal ions flows back into the first container 1.

After a few cycles, the filtrate can be regenerated by, for example, depositing the corresponding metals electrolytically on the anode or by distillation.

I claim:

1. A process for recycling fluorescent and television tubes containing yttrium, which are first crushed, after which the metallic constituents are separated off, and the broken glass produced is washed and fed to the glass recycling process, wherein the tubes are introduced into a container which can be sealed in a gas-tight manner and are crushed under water, the ascending gases released being drawn off by suction and placed in a compressed state, feeding the gases in a compressed state to a reuse process, and an acid which dissolves or strips off the pollutants being added to the broken glass which is coated with pollutants, the dissolved and stripped-off pollutants are flushed out of the broken glass to form a liquid phase containing yttrium and the metallic constituents are removed therefrom, and then the broken glass is passed to a further utilization process, a precipitating agent is added to the liquid phase and the latter is then filtered to form a filtrate and a yttrium containing filter cake, supplying the yttrium-containing filter cake to a lanthanide process, after which the filtrate is fed back to the container in which the tubes are crushed.

2. The process as claimed in claim 1, wherein the $HBF_4$ acid is added as the acid which dissolves the pollutants.

3. The process is claimed in claim 2, wherein the $HBF_4$ acid is added up to a concentration of 0.5%.

4. The process as claimed in claim 2, wherein the filtrate containing $HBF_4$ acid is regenerated after several cycles and the metals dissolved therein are chemically or electrolytically removed from it for reutilization.

5. The process as claimed in claim 1, wherein oxalic acid is added to the filtrate as precipitating agent.

* * * * *